United States Patent

Chivers et al.

[11] 3,790,941
[45] Feb. 5, 1974

[54] ANTENNA TRACKING SYSTEMS

[75] Inventors: Malcolm Chivers; Thomas William Grant Dawson; Paul Henry Masterman, all of Christchurch; Martin Andrew Weston, New Milton, all of England

[73] Assignee: The Secretary of State for Defence in Her Britannic Majesty's Government of the United Kingdom of Great Britain and Northern Ireland, London, England

[22] Filed: Mar. 27, 1972

[21] Appl. No.: 238,626

[30] Foreign Application Priority Data
Mar. 31, 1971 Great Britain .................... 8,304/71

[52] U.S. Cl. ...... 343/100 PE, 343/16 R, 343/113 R, 343/117 R, 343/786
[51] Int. Cl. ........................................... H01q 21/24
[58] Field of Search.... 343/16, 16 SD, 100 PE, 113, 343/117, 772, 786, 858

[56] References Cited
UNITED STATES PATENTS
3,530,471  9/1970  Mark ............................... 343/117 R
3,665,481  5/1972  Low et al. ........................... 343/786

*Primary Examiner*—Benjamin A. Borchelt
*Assistant Examiner*—Richard E. Berger
*Attorney, Agent, or Firm*—Moore & Hall

[57] ABSTRACT

Apparatus for controlling a steerable antenna to track a distant radio source, according to the relative phase and amplitude of TM01 mode signals and TE11 mode signals developed in a circular waveguide which receives the radio signals collected by the antenna. The apparatus comprises a TM01 mode coupler and a modulator arranged to apply a cyclic modulation to signals derived from the TM01 mode, a second coupler connected to combine the modulated signals with signals derived from the TE11 mode signals to form an amplitude-modulated resultant signal, and detector means for deriving tracking control signals from the amplitude modulation on the resultant signal. The modulation may be a sawtooth or a sinusoidal waveform and the detector means may comprise a phase sensitive detector for comparing the amplitude modulation with the modulation control waveform. Alternatively the modulation may be a four-step staircase or a staircase with the steps transposed; then the detector means may comprise four detectors arranged to operate in synchronism with the steps of the staircase and two differential amplifiers. The second coupler may be connected to the circular waveguide by a polarizer. The modulator may be a ferrite phase shifter but a diode balanced modulator may be used if the modulation is sinusoidal.

8 Claims, 6 Drawing Figures

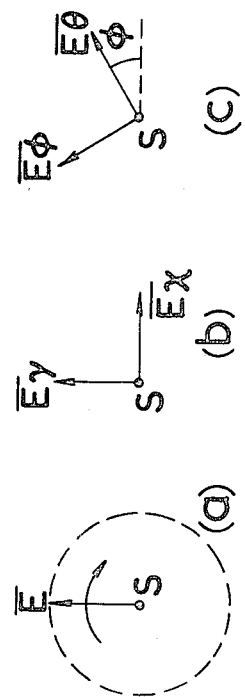
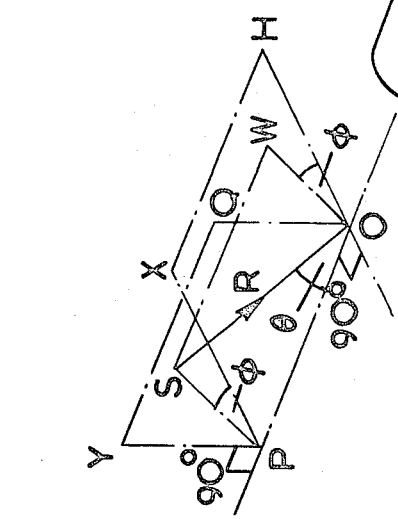
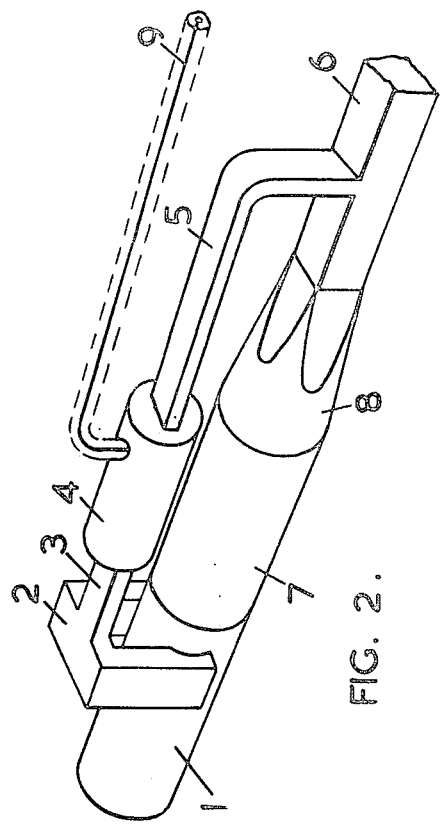
FIG. 1.
FIG. 2.

ANTENNA TRACKING SYSTEMS

BACKGROUND OF THE INVENTION

The present invention relates to steerable antennae used in satellite tracking and radar tracking systems.

In order to receive a signal consistently from an earth satellite or any other object in space it is necessary to maintain a receiver antenna system in accurate alignment with the signal source.

Known methods of maintaining alignment are complicated and some require as many as three low noise microwave receivers which often have to be mounted close to the radiating element itself, that is to say on the steerable antenna. This is expensive, inconvenient for servicing and adjustment, and tends to complicate the design of the antenna system. One such method is known as "two mode tracking" and is described in the Bell System Technical Journal volume XLII no 4 part 2, July 1963 at page 1283 et seq. This method utilizes the phenomena that a microwave signal incident on the aperture of a circular waveguide car excite both $TE_{11}$ and $TM_{01}$ mode signals in the waveguide. The relative strength of the two modes is dependent on the alignment of the electrical axis of the waveguide with the direction of incidence of the incoming signals. When the waveguide is exactly aligned with the line of sight to the signal source, the $TM_{01}$ mode signal is practically eliminated. For small misalignment angles ($\theta$) between the axis of the waveguide and the sight-line to the signal source the $TE_{11}$ mode signal is relatively unaffected but both the strength and the phase of the $TM_{01}$ mode signal alter sharply.

It is shown in the aforesaid publication that if a circular waveguide is receiving radiation from a source, and the radiation emitted from the source is circularly polarized or almost circularly polarized, and the position of the source is defined with respect to the waveguide and its axis by spherical polar coordinates R, $\theta$ and $\phi$, then the radiation may induce $TE_{11}$ and $TM_{01}$ mode field patterns in the waveguide, but the $TM_{01}$ mode will be excited only by the $E_\theta$ component of the source radiation and not by its $E_\phi$ component. When $\theta$ is small, that is to say the waveguide axis points close to but not exactly at the source, the amplitude of the $TM_{01}$ mode signal is directly proportional to $\theta$. In practice, $\theta$ will be the small pointing error, which it is desired to minimize. The phase of the signals in the $TM_{01}$ mode relative to the phase of the induced $TE_{11}$ mode signals, indicates the direction $\phi$ of the pointing error. The $TE_{11}$ mode signals can be used as a reference against which the magnitude and phase of the $TM_{01}$ signals can be measured, since the $TE_{11}$ mode is excited by both the $E_\theta$ and $E_\phi$ components of the incident radiation, and its amplitude is only very slightly affected by small pointing errors.

Control signals for controlling the directing of the axis of an antenna system may be derived from measurements of the relative magnitude and the phase of the $TM_{01}$ signals with respect to the $TE_{11}$ signals in the receiving horn of the antenna. UK patent 1,174,401, the corresponding U.S. Pat. No. 3,530,471, and U.S. Pat. No. 3,665,481, disclose other systems using this technique.

SUMMARY OF THE INVENTION

It is an object of the present invention to provide a relatively simple and relatively compact tracking control system for a satellite tracking antenna.

According to the present invention there is provided apparatus for controlling a steerable antenna to collect electromagnetic wave signals from a distant source, including: a circular waveguide for receiving electromagnetic wave signals collected by the antenna, for supporting circularly polarized $TE_{11}$ mode signals in response to circularly polarized electromagnetic wave signals received from a distant source approximately or exactly in line with a predetermined steerable axis of the antenna, and for supporting $TM_{01}$ mode signals in response to electromagnetic wave signals received from a distant source near to but not on the predetermined axis; a $TM_{01}$ coupler responsive to $TM_{01}$ mode signals developed in the circular waveguide; a modulator connected to the output of the $TM_{01}$ coupler; control means for applying a cyclic modulation control waveform to the modulator; a polarizer constructed to transform the said circularly polarized TE11 mode signals into TE11 mode signals linearly polarized in a given plane; a square section waveguide connected to the polarizer for propagating the said TE11 mode signals linearly polarized in the said given plane; a second coupler connected to combine output signals from the modulator with the said $TE_{11}$ mode signals linearly polarized in the said given plane to produce an amplitude-modulated resultant signal within the square section waveguide; receiver apparatus responsive to the said TE11 mode signals linearly polarized in the said given plane; and detector means for deriving tracking control signals from the amplitude modulation on the said resultant signal to indicate parameters of any misalignment between the predetermined axis of the antenna and the mean direction of incidence of the electromagnetic wave signals from the distant source.

The modulation control waveform may be a linear sawtooth waveform or a sinusoidal waveform, and the detector means may be a phase sensitive detector connected to compare the amplitude modulation on the said resultant signal with the modulation control waveform and to provide signals indicating the amplitude and relative phase of the said amplitude modulation.

The modulator may comprise an electrically controllable phase shifter. Alternatively, if the modulation control waveform is sinusoidal, the modulator may be a balanced-modulator circuit using a plurality of diodes.

Alternatively, the modulation control waveform may be a staircase waveform of four steps, or a four-step waveform equivalent to a staircase waveform with the order of the steps transposed; the modulator may then be an electrically controllable phase shifter, and the detector means may comprise four detectors connected to operate sequentially in synchronism with the steps of the modulation control waveform, with two differential amplifiers connected to derive misalignment indicating signals from the differences between the outputs of different pairs of the detectors.

The $TM_{01}$ mode coupler may be a hybrid coupler and may be constructed to suppress all but a desired band of signal frequencies including the beacon signals as hereinafter described. The second coupler may also be a hybrid coupler.

BRIEF DESCRIPTION OF THE DRAWINGS

An embodiment of the invention will now be described by way of example only with reference to the accompanying drawings of which:

FIG. 1 shows vectorial representations of the electric field component of a circularly polarized electromagnetic wave, FIG. 2 shows a perspective view of waveguide apparatus forming part of an antenna system, with a geometric construction showing spherical polar co-ordinates R, $\theta$, $\phi$ used to define the position of a distant source S of radio signals with respect to the waveguide apparatus.

DESCRIPTION OF THE PREFERRED EMBODIMENTS

Figure 3:
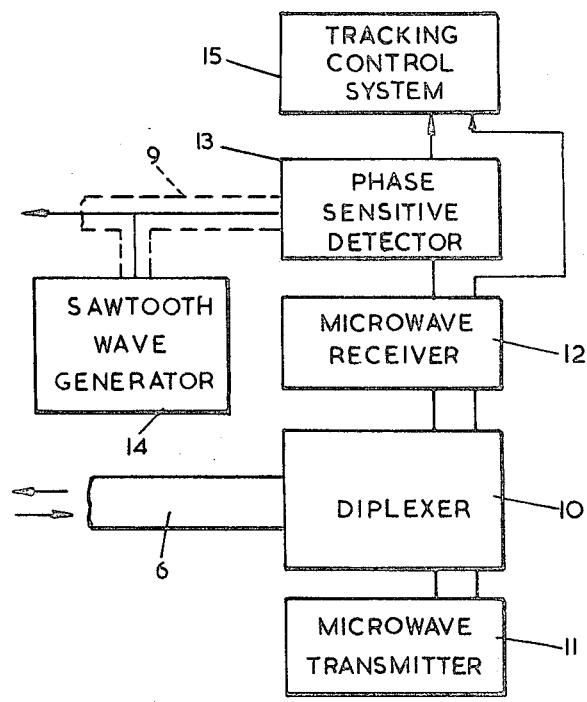
FIG. 3 is a block circuit diagram of part of a microwave receiving system for use with the apparatus of claim 2 in the antenna system.

FIG. 1 shows three alternative representations of the electric field of a circularly polarized electromagnetic wave. It may be represented by a single field vector $\bar{E}$, representing an electric field of constant strength, whose direction rotates at a constant rate, as indicated as (a) in FIG. 1. It may alternatively be considered as the resultant of two linearly polarized electromagnetic waves, which are polarized in two planes at right angles to each other and vary sinusoidally in quadrature with each other. For instance, it may be represented by vectors $\bar{E}_x$ and $\bar{E}_y$, as shown at (b) in FIG. 1, which are fixed in direction and vary in magnitude according to the equations $$|\bar{E}_x| = E_o \sin wt \quad (1)$$

and $$|\bar{E}_y| = E_o \cos wt \quad (2)$$

where $E_o$ is a constant, t is a time variable and w is the angular frequency of the microwave signal. It may equally well be represented by vectors $\bar{E}_\theta$ and $\bar{E}_\phi$, as shown at (c) in FIG. 1, which also represent linearly polarized electromagnetic waves, polarized in planes at right angles to each other and varying sinusoidally in quadrature. The vectors $\bar{E}_\theta$ and $\bar{E}_\phi$ must be equivalent to the resultants of components of $\bar{E}_x$ and $\bar{E}_y$ resolved in planes inclined at an angle $\phi$ to the planes of $\bar{E}_x$ and $\bar{E}_y$ respectively; therefore if $\bar{E}_x$ and $\bar{E}_y$ are given by equations (1) and (2), $\bar{E}_\theta$ and $\bar{E}_\phi$ must vary as $$|\bar{E}_\theta| = E_o \sin(wt + \phi) \quad (3)$$
$$|\bar{E}_\phi| = E_o \cos(wt + \phi). \quad (4)$$

These relationships will be useful in the explanation and analysis of the system described hereinafter.

FIG. 2 shows a section of circular waveguide 1 which is provided with a $TM_{01}$ mode coupler 2. The otuput of the mode coupler 2 is connected via a rectangular waveguide 3 to a ferrite phase-modulator 4. The output of the phase-modulator 4 is connected via another rectangular waveguide 5 into a square waveguide 6. The circular waveguide 1 is connected via a polarizer section 7 and an transition waveguide section 8 to one end of the square waveguide 6. The phase modulator 4 has a control input which is connected to a co-axial line 9.

The waveguide apparatus (items 1 to 9 in FIG. 2) forms part of a steerable antenna system which is arranged to collect electromagnetic radiation from a distant source S and direct it into the waveguide 1. The antenna system may include a simple horn, a Cassegrainian or a Gregorian arrangement of reflectors, or a folded horn. For the sake of clarity FIG. 2 shows only those features of the apparatus necessary for an understanding of the invention, for a simple non-folded horn or reflector system in which the point 0 is a point in the center of the aperture of the system and the line OP is an extension of the axis of the waveguide 1. The antenna system is directed towards the distant source S with a slight misalignment, which is to be measured. FIG. 2 shows a geometric construction indicating the parameters hereinafter used to define and measure the misalignment. As already mentioned, the line OP in this construction is an extension of the axis or boresight line of the waveguide 1. OH is a horizontal line and the plane POHX is used as a reference plane. OQYP is a vertical plane at right angles to the reference plane POHX. OS is the line of sight to the distant source. OWSP is the sight plane containing the boresight line OP and the line of sight OS. $\phi$ is the angle between the sight plane and the reference plane, measured in a plane normal to the boresight line OP. $\theta$ is the angle between the line of sight OS and the boresight line OP. In paractice the angle $\theta$ will be very small, probably only a fraction of a degree, and the purpose of the apparatus is to minimize it. The angle $\phi$ may have any value from zero to three hundred and sixty degrees; it must be measured to determine how to steer the antenna system in order to minimize $\theta$.

The waveguide apparatus (items 1 to 8) shown in FIG. 2 is preferably mounted close to a feed horn (not shown) in the steerable part of the antenna system. FIG. 3 shows a block diagram of receiving and tracking control apparatus, of which at least some parts may be mounted in a more convenient or more accessible position, and which will be connected to the parts 6 and 9 of FIG. 2 by conventional means. Clearly the arrangement is very convenient and compact since only one waveguide connection 6 and one coaxial cable connection 9 are required to connect the parts of FIG. 2 with the parts of FIG. 3.

FIG. 3 shows the square waveguide 6 connected by a diplexer 10 to a microwave transmitter 11 and a microwave receiver 12. The receiver 12 has two outputs, connected to a phase sensitive detector 13, and a tracking control system 15 respectively. A sawtooth waveform generator 14 is connected by the co-axial line 9 to the modulator 4 on FIG. 2 and also to a reference input of the detector 13. The detector 13 has an output connected to the tracking control system 15.

Figure 4:
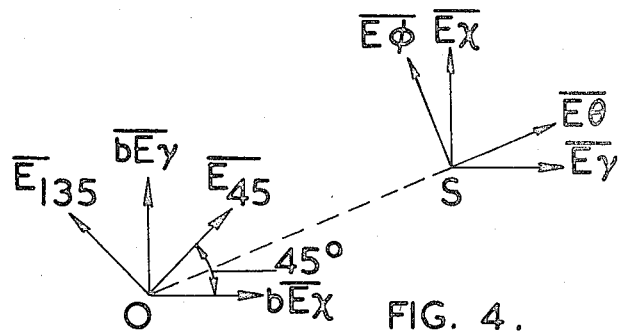
FIG. 4 is a vector diagram showing the relationships of various components of the signals involved in the operation of the system.

The distant source S, which may be a satellite relay transponder, transmits circularly polarized electromagnetic waves. FIG. 4 represents the relationships between various useful alternative representations of these waves from the viewpoint of an observer in the waveguide 1.

The embodiments of FIGS. 2 and 3 allow both the reception and transmission of microwave signals as with conventional systems. In the transmitting mode signals from the transmitter 11 are conveyed through the diplexer 10, along the waveguides 6, 8, 7 and 1 to the antenna (not shown). In the waveguide 6 the transmitter signals are linearly polarized in the horizontal plane POHX, orthogonal to the received signals, so that they do not affect the parts provided to operate on the received signals. The use of a square waveguide to carry transmitter signals and received signals polarized in orthogonal planes is known in the art. The present description however is concerned mainly with the received signals and with the derivation of tracking information from the received signals.

When microwave signals are received in the circular waveguide 1 from the source S and the source S is not exactly aligned with the axis of the waveguide (as shown for example in FIG. 2) waves in the two dominant modes $TE_{11}$ and $TM_{01}$ propagate along the waveguide towards the polarizer 7.

It is a common practice in designing satellite communcations systems to provide a narrow-band beacon signal which is radiated by the satellite to assist tracking operations, and is received by the tracking station antenna with the main communications signals. In the following description it may be taken, for simplicity, that the only signals considered are derived from the narrow-band beacon signals, and any possible effects due to the communications signals or their modulation will be ignored. In practice, conventional apparatus for detecting and processing the communications signals will also be provided, but this will not affect the operation of the tracking operations hereinafter described.

It has been shown in the Bell System Technical Journal reference hereinbefore mentioned, that the $TE_{11}$ mode signals excited in the waveguide 1 will depend on both the $\bar{E}_\theta$ and the $\bar{E}_\phi$ components of the signals transmitted from the distant source S, in such a way that the $TE_{11}$ mode signals in the waveguide 1 will have a circular polarization corresponding to the circular polarization of the source signals; hence they may be represented by vectors $bE_y$ and $bE_x$ where b is a constant, as shown in FIG. 4.

The polarizer 7 is a conventional component, comprising essentially a ridged or flattened circular waveguide of such length that signals propagating with their electric field transverse to the ridge will have their phase delayed by ninety degrees relative to signals propagating with their electric field parallel to the ridge. As shown in FIG. 4, the circularly polarized $TE_{11}$ waves approaching the polarizer 7 in the waveguide 1 may be considered as the resultant of components $\bar{E}_{45}$ and $\bar{E}_{135}$, whose magnitudes will be given by $|\bar{E}_{45}| = \bar{E}_1 \sin(wt + \pi/4)$ and $|\bar{E}_{135}| = E_1 \cos(wt + \pi/4)$ respectively, where $E_1$ is a constant. The polarizer 7 is arranged with its ridge at forty-five degrees to the reference plane POHX, so as to delay the component $\bar{E}_{135}$ by a phase angle of 90° relative to the component $\bar{E}_{45}$. Hence the components $\bar{E}_{45}$ and $\bar{E}_{135}$ go into the polarizer 7 in quadrature, but leave it in phase with each other, so that they will form a resultant in the waveguides 8 and 6 which is linearly polarized in the vertical plane OQYP and varies with a phase corresponding to the phase of the $\bar{E}_{45}$ component.

However, the $TM_{01}$ mode signals in the waveguide are excited only by the $\bar{E}_\theta$ component and will vary with a phase corresponding to the phase of the $\bar{E}_\theta$ component, given by equation (3). For small misalignments, their amplitude will be proportional to the magnitude of the angle $\theta$. The $TM_{01}$ mode coupler 2 responds to these signals by propagating corresponding signals (in a $TE_{11}$ mode) in the waveguide 3, through the ferrite phase modulator 4 and into the waveguide 5. The sawtooth waveform generator 14 applies a sawtooth control waveform of frequency 1 kHz to the modulator 4, causing the modulator 4 to impart a phase shift to the signals propagated through it, which varies substantially linearly from zero up to 360° in each cycle of the sawtooth control waveform.

It follows that the amplitudes of the two signals applied to the waveguide 6 from the waveguide 5 and the transition 8 can be represented by the expressions $A\theta \sin(wt + \phi + 2\pi t/T + C)$ and $B \sin(wt + D)$ respectively, where A, B, C, and D are constants and T is the period of the sawtooth control waveform. Either one or the other of the constants C and D can be made equal to zero without loss of generality, by choosing to measure the time $t$ from a suitable instant. The waveguide parts 2, 3, 5 and 8 can be made of such lengths, or have a fixed phase shifter incorporated in one of them, to make the constants C and D equal. The factor $2\pi/T$ can be represented by a symbol $m$, so that the relative amplitudes of the two signals applied to the waveguide 6 can be adequately represented by the simpler expressions $A\theta \sin(wt + \phi + mt)$ and $B \sin wt$ respectively. They combine vectorially in the waveguide 6 to form a resultant signal of the carrier frequency $w$, linearly polarized in the vertical plane OQYP and modulated in phase and amplitude according to the variable phase difference $\phi + mt$, to an extent depending on the ratio of the terms $A\theta$ and B.

The microwave receiver 12, which is entirely conventional in construction, detects the amplitude-modulation on the resultant signal from the waveguide 6, and produces a corresponding output signal. The conventional phase sensitive detector 13 compares the output signal of the receiver 12 with the sawtooth control waveform from the generator 14, and produces a signal indicating their phase difference, which indicates the magnitude of the angle $\phi$. The receiver 12 also provides a signal indicating the modulation depth of the amplitude-modulation, which is substantially proportional to the angle $\theta$. These signals therefore indicate the direction and the extent of the misalignment, and are therefore suitable for controlling the tracking system 15 to minimize the misalignment, by causing azimuth and elevation movements in senses and relative proportions dependent on the direction ($\phi$ indicating) signal and of magnitudes dependent on the magnitude ($\theta$ indicating) signal. The tracking system 15 can be conventional, for instance similar to the system described in the Bell System Technical Journal reference hereinbefore mentioned.

The above-described embodiment is of course only one possible form of the invention. Many alternative forms or modifications of the invention may also be useful or advantageous. The phase modulator 4 could be replaced by a diode balanced-modulator circuit in which case the sawtooth waveform generator 14 would probably be replaced by a sine wave generator. Any suitable modulating frequency may be used. Filters could be incorporated, either to suppress unwanted sidbands or to prevent excessive transmitter power from reaching the modulator. When the invention is used in a folded horn, or other antenna system which does not provide a direct line-of-sight between the feed waveguide and the distant source, the sight-line OS In FIG. 2 should be understood as representing the mean direction of the incident waves approaching the feed waveguide; the angles $\phi$ and $\theta$ will then bear a relationship to the misalignment of the antenna which will be determined by the geometry of the antenna system and can readily be allowed for in the tracking control system. It is thought that other embodiments may possibly be constructed with the polarizer 7 connected in the waveguide 1 between the mode coupler 2 and the feed horn of the antenna system. If the polarizer 7 was omitted, the signal/noise ratio would be severely degraded unless a device to make the modulated signal circularly polarized was inserted in the waveguide 5 and the second coupler was constructed to combine circularly polarized waves.

It is not essential that a separate beacon signal be provided by the satellite. The invention could operate on the main communications signal although if communications signals are allowed to pass through the parts 2, 3, 4 and 5 the modulation waveform may introduce some additional noise into the communication circuits which may then be connected to the receiver 12.

The signals supplied to the tracking control system 15 represent the polar co-ordinates of the signal source and may have to be converted into cartesian co-ordinate form before they are suitable for controlling the aximuth and elevation servos of the tracking control system. In an alternative form of the invention the tracking control signals are derived directly in cartesian co-ordinate form with reference to the planes POHX and OQPY as shown in FIG. 2.

An embodiment of this form of the invention will now be described with reference to FIGS. 5 and 6.

Figure 5:
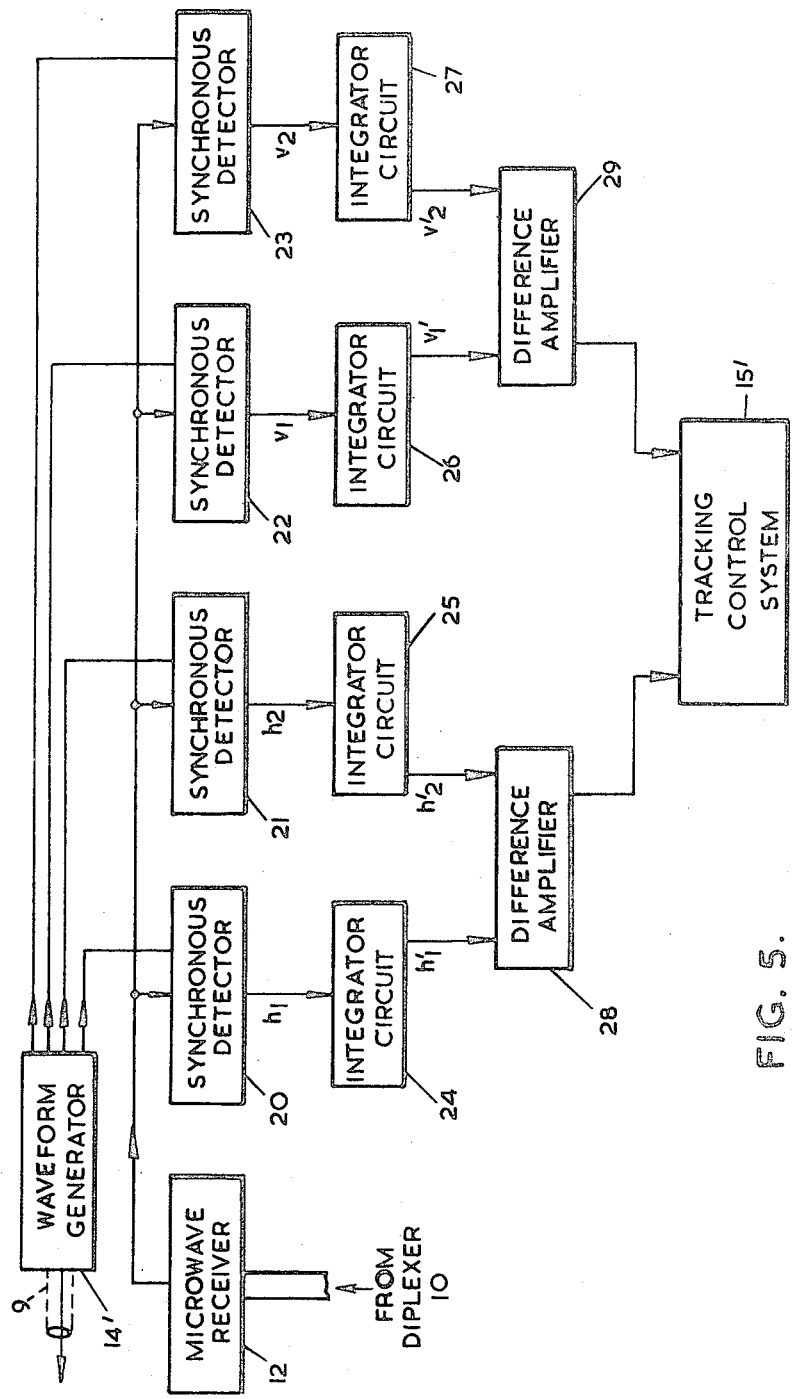
FIG. 5 is a block circuit diagram of part of an alternative receiving system for use with the apparatus of FIG. 2.

The apparatus of FIG. 5 performs a similar function to that of FIG. 3 and the same or similar parts are given the same references. The output of the receiver 12 is connected to signal inputs of four synchronous detector circuits 20, 21, 22 and 23. A waveform generator $14^1$ replaces the sawtooth generator 14 of FIG. 3. It produces a staircase voltage waveform which is supplied to the control input of the modulator 4, and also produces four trains of synchronizing pulses which control the detectors 20 to 23 respectively. The detectors 20, 21, 22 and 23 have signal outputs $h1, h2, v1$ and $v2$ respectively which are connected to the integrator circuits 24, 25, 26 and 27 respectively. The signal outputs $h'1$ and $h'2$ of the integrators 24 and 25 respectively are subtracted in a difference amplifier 28 and the signal outputs $v'1$ and $v'2$ of the integrators 26 and 27 respectively are subtracted in another difference amplifier 29. The output of the difference amplifier 28 is connected to a control input of the tracking control system $15^1$ while the output of the difference amplifier 29 is connected to another control input of the system $15^1$.

Figure 6:
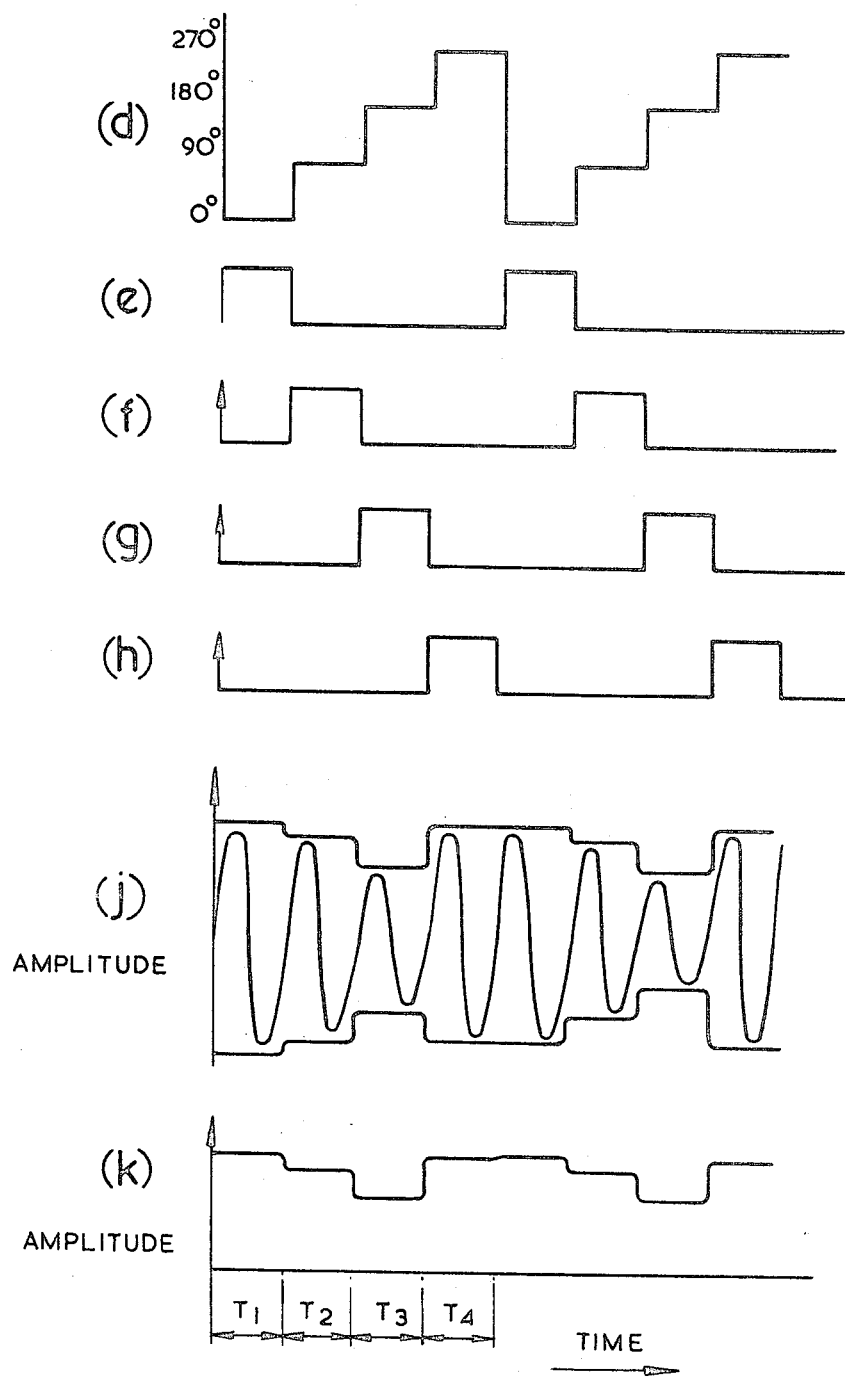
FIG. 6 is a diagram showing the waveforms of some of the signals occurring in the system of FIG. 5.

FIG. 6 shows waveforms $(d), (e), (f), (g), (h), (j)$ and $(k)$ plotted against a common horizontal time scale. The waveforms $(d), (e), (f), (g)$ and $(h)$ represent the staircase waveform and the four synchronizing pulse trains respectively, all provided by the waveform generator $14'$. The waveform $(j)$ represents the envelope of a typical amplitude modulated signal developed in the waveguide 6 by the vectorial combination of the signal from the modulator 4 with the signal from the polarizer 7. The sine wave drawn within the envelope is included merely as a reminder and an indication of the presence of the carrier frequency, which will of course be such a comparatively high frequency it could not be conveniently drawn to the same time scale. The waveform $(k)$ represents the output signal of the receiver 12.

The four pulse trains $(e), (f), (g), (h)$ render the four detectors 20, 22, 21 and 23 operative sequentially, in that order. For convenience, the time intervals corresponding to the first four steps shown in the waveform $(d)$ have been referenced T1, T2, T3 and T4 respectively. The modulator 4, being now controlled by the waveform $(d)$, applies to the signal derived from the $TM_{01}$ mode a phase shift which advances in steps, which are arranged to be ninety-degree steps. As before, any misalignment of the boresight line OP from the direction of incidence OS Of the received signals produces an additional phase difference between the two signals which are combined in the waveguide 6. Mathematically, the effect of this stepped phase modulation is to replace the linearly increasing term mt with a term $M(t)$ which takes the values $0, \pi/2, \pi$, and $3\pi/2$ during the time intervals T1, T2, T3 and T4 respectively. The detector outputs $h1, h2, v1, v2$ represent the amplitude of the resultant signal during the time intervals T1, T3, T2 and T4 respectively.

These outputs are stored in the integrator circuits 24, 25, 26 and 27 respectively so that $h1$ and $h2, v1$ and $v2$ can be compared in the difference amplifiers. The output of the difference amplifier 28 represents the difference between the amplitude during interval T1 and the amplitude during the interval T3. If $A\theta$ is much less than B, this difference will be proportional to $\theta \cos \phi$. If $A\theta$ is not small in relation to B, the difference depends on $\theta \cos \phi$ according to a more complicated and non-linear relationship; however it will have the same sign as $\cos \phi$ and will increase when $\theta \cos \phi$ increases, so it can be used as a tracking control signal to operate the control system $15^1$ so as to minimize $\theta \cos \phi$. Similarly the output of the differential amplifier 29, which represents the difference between the amplitude during the interval T2 and the amplitude during the interval T4, depends on $\theta \sin \phi$ and can also be used as a tracking control signal.

Thus the outputs of the differential amplifiers can provide signals for controlling tracking servo systems operating in two orthogonal directions, to minimize the misalignment between the lines OP and OS in FIG. 2. The sequence of the steps in the waveform (D) could be transposed into any other order, if the connections to the detectors were corresponding transposed.

I claim:

1. Apparatus for controlling a steerable antenna to collect electromagnetic waves from a distant source including:

circular waveguide means for receiving electromagnetic wave signals collected by the antenna for supporting circularly polarized TE11 mode signals in response to circularly polarized electromagnetic wave signals received from a distant source near to or on a predetermined steerable axis of the antenna and for supporting TM01 mode signals in response to electromagnetic wave signals received from a distant source near to but not on the predetermined axis, a TM01 mode signal coupler means connected to the circular waveguide means and responsive to TM01 mode signals developed in the circular waveguide means, a modulator connected to the output of the TM01 mode coupler means, control means connected to the modulator for applying a cyclic modulation control waveform to the modulator, a polarizer connected to the circular waveguide means and constructed to transform the said circularly polarized TE11 mode signals into TE11 mode signals linearly polarized in a given plane, a square section waveguide connected to the polarizer and capable of propagating the said TE11 mode signals linearly polarized in the said given plane, a second coupler means connected to the modulator and to the square section waveguide for feeding the output signals from the modulator into the said square section waveguide so that they will combine with the said TE11 mode signals linearly polarized in the said given plane and will thereby form an amplitude modulated resultant signal within the square section waveguide, receiver apparatus connected to the square section waveguide and responsive to signals linearly polarized in the said given plane within the said square section waveguide, and detector means connected to the said receiver apparatus for deriving tracking control signals from the amplitude modulation on the said resultant signal to indicate parameters of any misalignment between the predetermined axis of the antenna and the mean direction of incidence of the electromagnetic wave signals from the distant source.

2. Apparatus as claimed in claim 1 having a diplexer means connecting the said square section waveguide to the said receiver apparatus, and transmitter means for transmitting signals through the diplexer means, the square section waveguide, the polarizer and the circular waveguide to the antenna.

3. Apparatus as claimed in claim 1 and wherein the control means comprises a linear sawtooth generator and the modulator is an electrically controllable phase modulator constructed to advance the phase of the TM01 mode signal in response to the control waveform.

4. Apparatus as claimed in claim 3 and wherein the detector means comprises a phase sensitive detector connected to compare the amplitude modulation on the said resultant signal with the modulation control waveform and to provide signals indicating the amplitude and relative phase of the said amplitude modulation.

5. Apparatus as claimed in claim 4 and wherein the phase modulator is a ferrite phase shifter.

6. Apparatus as claimed in claim 1 and wherein the control means comprises means for generating a four step staircase waveform and the modulator is an electrically controllable phase modulator constructed to advance the phase of the TM01 mode signal through 90°, with respect to the TE11 mode signal, at each step in the said staircase waveform.

7. Apparatus as claimed in claim 6 and wherein the detector means comprises four detectors connected to operate sequentially and in synchronism with the steps in the modulation control waveform, and two differencing amplifiers connected to the said detectors to derive misalignment indicating signals from the difference between the outputs of different pairs of the said detectors.

8. Apparatus as claimed in claim 1 and wherein the control means comprises a sine wave generator and the modulator comprises a diode balanced modulator constructed to change the frequency of the TM01 mode signal cyclically in response to the output of the said sine wave generator.

* * * * *